US012421852B1

(12) United States Patent
Al-Subaih

(10) Patent No.: US 12,421,852 B1
(45) Date of Patent: Sep. 23, 2025

(54) THREE-CYCLE (STROKE) ROTARY RADIAL VANE PISTON INTERNAL COMBUSTION ENGINE

(71) Applicant: Adel Al-Subaih, Kaifan (KW)

(72) Inventor: Adel Al-Subaih, Kaifan (KW)

( * ) Notice: Subject to any disclaimer, the term of this patent is extended or adjusted under 35 U.S.C. 154(b) by 0 days.

(21) Appl. No.: 18/907,621

(22) Filed: Oct. 7, 2024

(51) Int. Cl.

| | |
|---|---|
| ***F01C 1/063*** | (2006.01) |
| ***F01C 1/07*** | (2006.01) |
| ***F01C 19/02*** | (2006.01) |
| ***F02B 53/02*** | (2006.01) |
| ***F02B 53/04*** | (2006.01) |
| ***F02B 53/08*** | (2006.01) |
| ***F02B 53/14*** | (2006.01) |
| ***F02B 55/02*** | (2006.01) |
| ***F02B 55/08*** | (2006.01) |

(52) U.S. Cl.
CPC ................ *F01C 1/063* (2013.01); *F01C 1/07* (2013.01); *F01C 19/02* (2013.01); *F02B 53/02* (2013.01); *F02B 53/04* (2013.01); *F02B 53/08* (2013.01); *F02B 53/14* (2013.01); *F02B 55/02* (2013.01); *F02B 55/08* (2013.01)

(58) Field of Classification Search
CPC .. F01C 1/063; F01C 1/07; F01C 19/02; F02B 53/02; F02B 53/04; F02B 53/08; F02B 53/14; F02B 55/02; F02B 55/08
See application file for complete search history.

(56) References Cited

U.S. PATENT DOCUMENTS

| | | | | |
|---|---|---|---|---|
| 12,158,101 | B1 * | 12/2024 | Al-Subaih | F02B 53/02 |
| 2004/0255898 | A1 * | 12/2004 | Demafiles | F02B 53/04 123/237 |
| 2009/0133665 | A1 * | 5/2009 | Ambardekar | F02B 53/00 123/245 |

* cited by examiner

*Primary Examiner* — Mary A Davis
(74) *Attorney, Agent, or Firm* — Sam Pierce

(57) ABSTRACT

A three-cycle radial vane piston internal combustion engine comprising an engine block integrating a cylindrical power casing, drive box, and compressor. The power casing includes air inlet, fuel injector, spark plug, and exhaust outlet ports, and houses three or more meshed radial vane pistons mounted on centrally located coaxial shafts forming three or more chambers. The coaxial shafts extend into the drive box, each shaft having a radial crank with a bushing at its end. The bushing is fitted with a slider/shaft joint unit with the slider side is sliding within radial slots of an off-center flywheel. The crank, slider/shaft joint, radial slot, and off-center flywheel form an inverted slider-crank mechanism linking the vanes' motion through the flywheel slots. The cyclically varying chamber volumes enable combined intake and exhaust, compression, and power strokes. The engine incorporates a compressed air kick start system for starting without a starter motor.

9 Claims, 6 Drawing Sheets

Prospective view of: (a) the radial vanes and drive mechanism with the casing hidden, and (b) one vane singled out with the slider flywheel.

Three vane successive operational views.

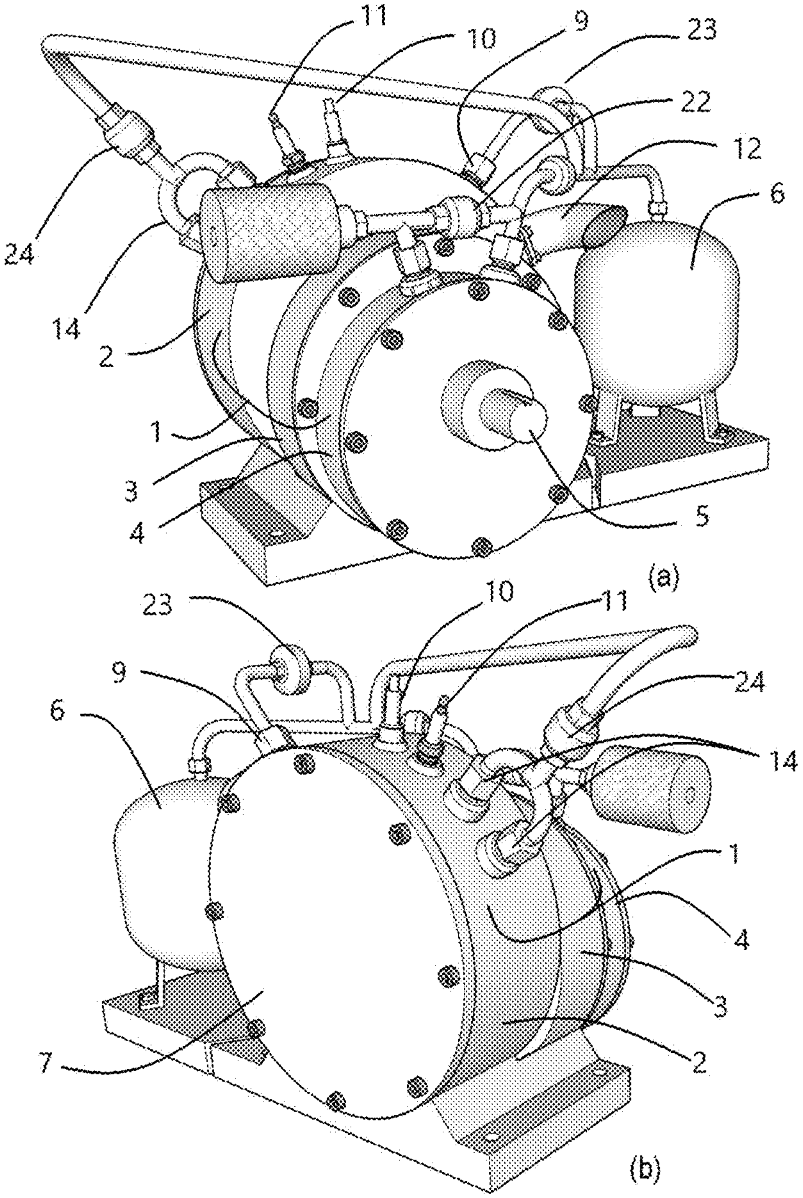
Figure 1: Prospective view of the engine shown from front and back

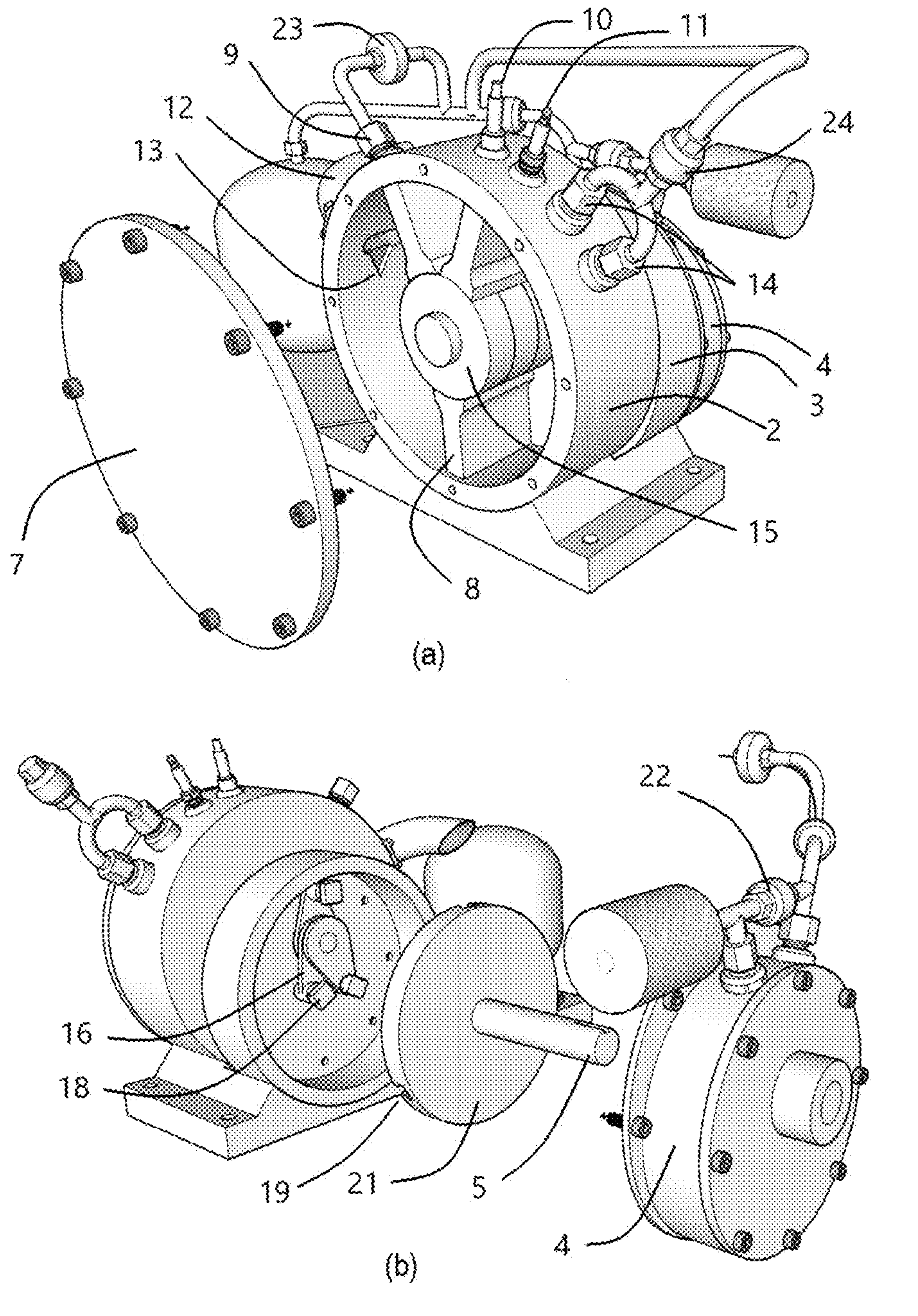
Figure 2: Prospective view of opened casing to show (a) Radial vanes and (b) drive mechanism.

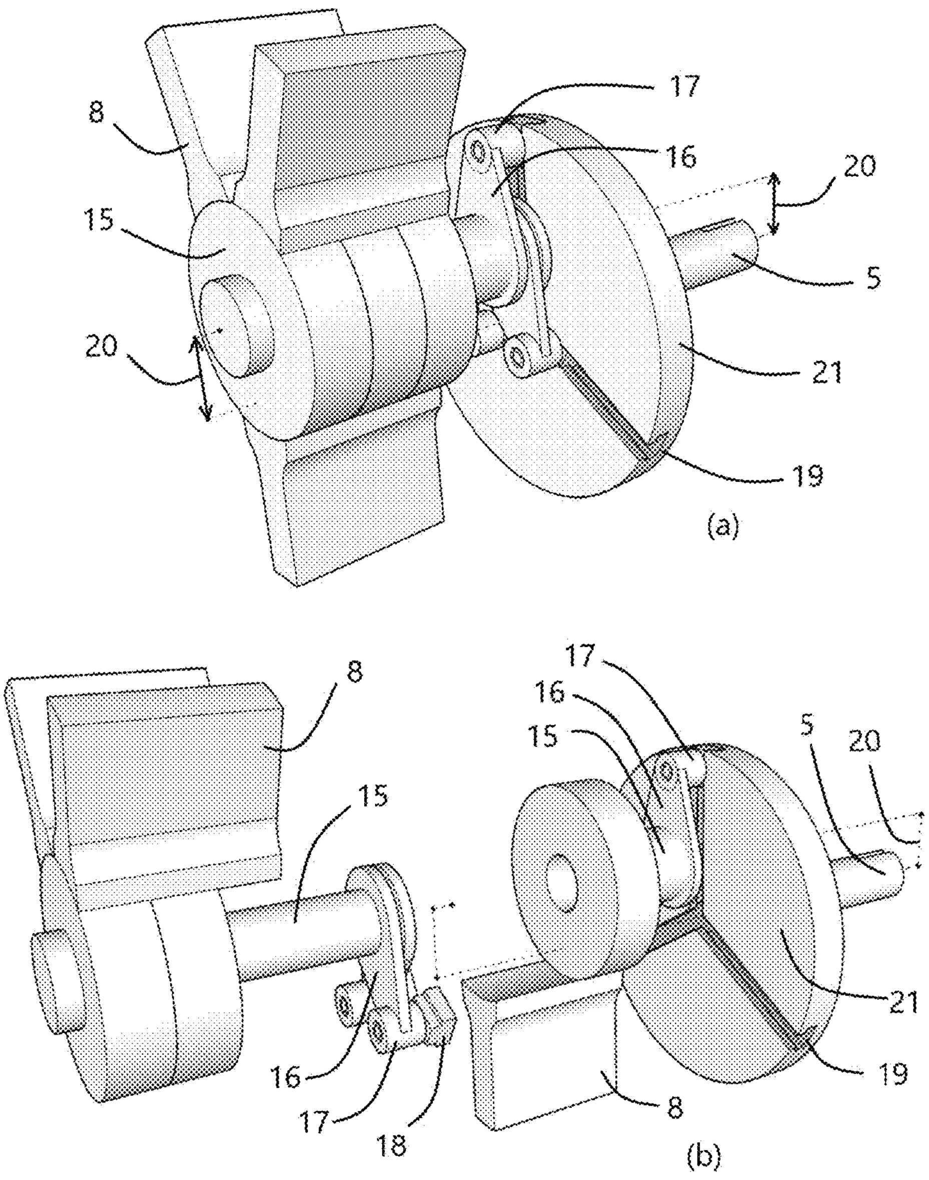
Figure 3. Prospective view of: (a) the radial vanes and drive mechanism with the casing hidden, and (b) one vane singled out with the slider flywheel.

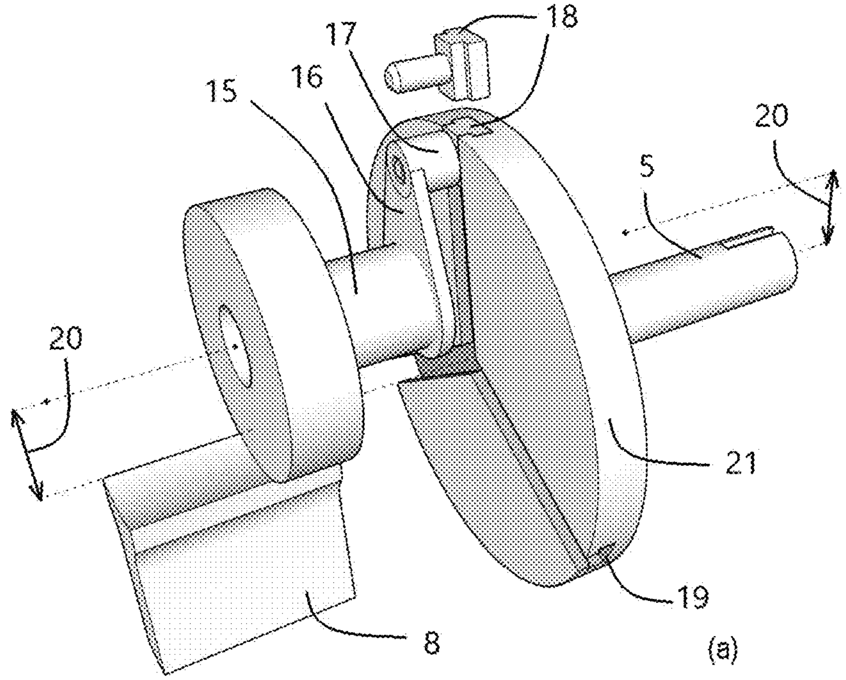
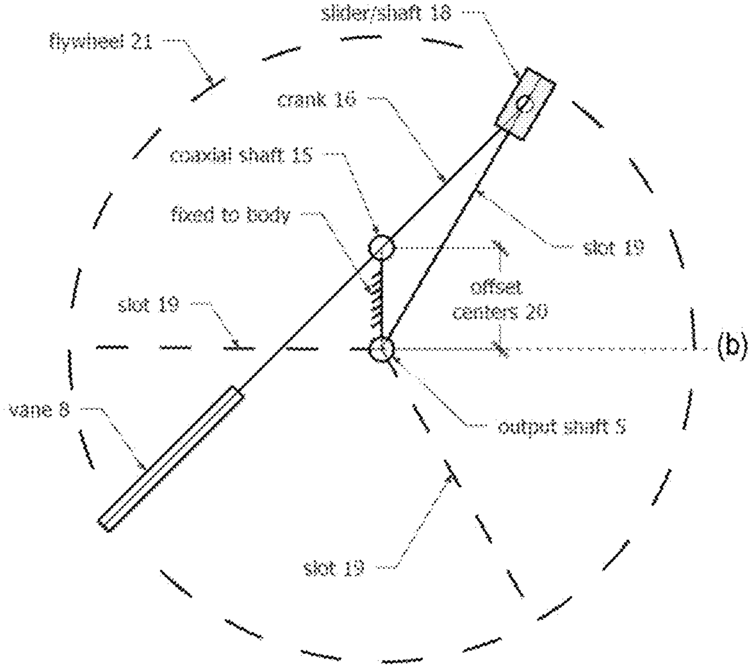
Figure 4: (a) Prospective view of a singled out vane, and (b) equivalent schematic drawing of inverted crank/slider mechanism.

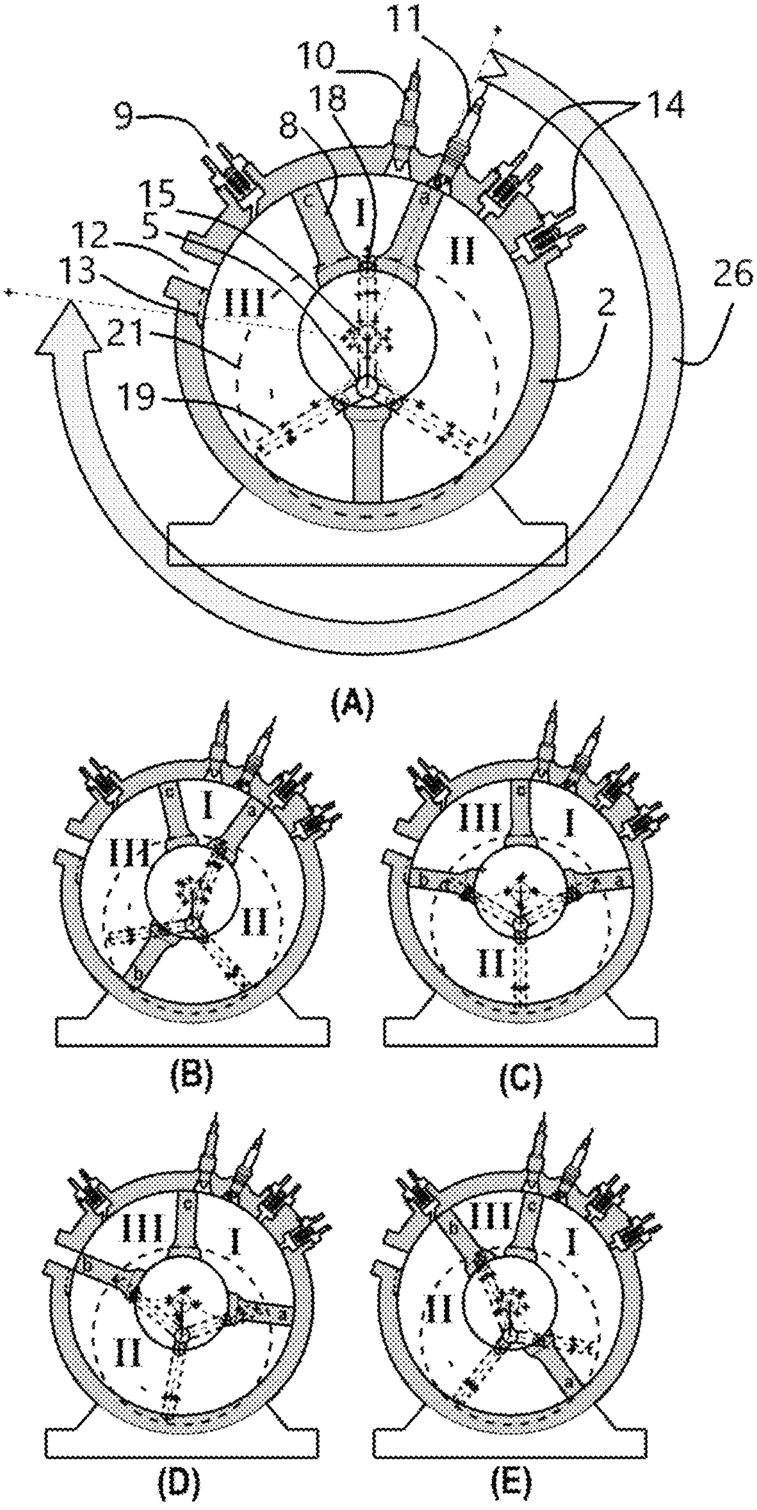
Figure 5: Three vane successive operational views.

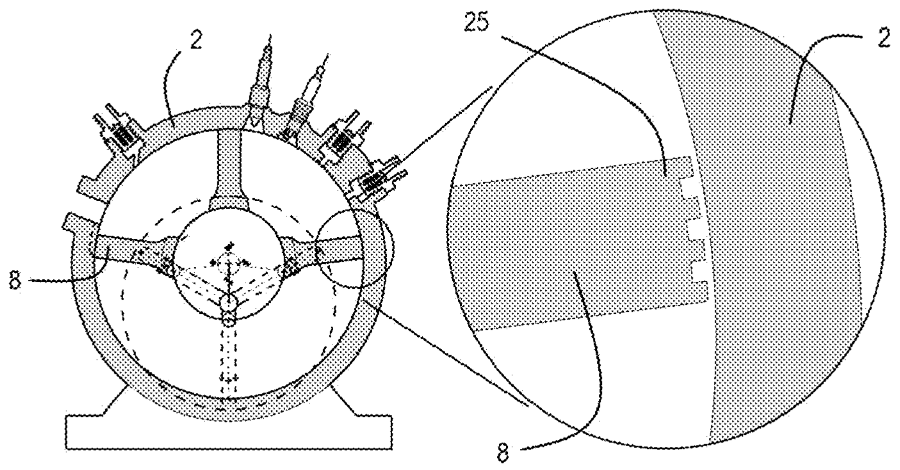
Figure 6: labyrinth-sealing feature.

THREE-CYCLE (STROKE) ROTARY RADIAL VANE PISTON INTERNAL COMBUSTION ENGINE

BACKGROUND

Field of the Invention

The present disclosure relates to the field of internal combustion engines, particularly rotary internal combustion engines.

Description of Related Art

Various types of rotary internal combustion engines are known in the art. Certain categories of existing designs employ meshed scissor-type radial pistons in a cylindrical casing, forming multiple chambers with a drive mechanism that provides two cycles per rotation. Examples of such configurations are described in U.S. Pat. Nos. 3,144,007; 5,069,604; 5,433,179; 5,537,973; 6,305,345; 7,721,701; 8,210,151; 8,511,277; 8,950,377; and U.S. Patent Application Publication No. 2010/0258075.

Another category of rotary engine designs utilizes multiple independent sliding vanes within an off-center rotor inside a cylindrical casing. The vanes form chambers that vary in volume as they rotate, allowing for two or four cycle operation. Examples of such designs are disclosed in U.S. Pat. Nos. 2,516,054; 3,886,909; 3,902,465; 4,848,296; 6,550,442; and 6,659,744.

However, existing rotary engine configurations suffer from certain limitations in terms of complexity, efficiency, and performance.

Accordingly, there is a need in the art for an improved rotary internal combustion engine that provides a simplified and compact design while enhancing efficiency and performance. The present disclosure addresses this need by introducing a novel three-cycle rotary engine configuration with independently linked radial vanes.

SUMMARY OF INVENTION

This summary is provided to introduce a selection of concepts, in a simplified format, that are further described in the detailed description of the invention. This summary is neither intended to identify key or essential inventive concepts of the invention nor is it intended for determining the scope of the invention.

The present disclosure is directed to a three-cycle radial vane piston internal combustion engine that addresses the limitations of prior art rotary engine designs. In one aspect, the invention provides a compact and efficient engine comprising an integrated cylindrical casing housing a power section, a drive mechanism, and a compressor.

In one embodiment, the power section includes three or more centrally pivoted radial vane pistons meshed on coaxial shafts, forming variable volume chambers. The vanes allow for no-contact labyrinth sealing, enabling oil-free operation. The power section further comprises a spark plug, fuel injector, air inlet, exhaust outlet, and strategically placed kick start air inlet ports with one-way valves to assist starting. A recess on the inner casing wall extends from the exhaust outlet to facilitate gradual release of combustion gases.

The coaxial shafts extend into the drive box, which contains an inverted slider-crank mechanism for each shaft. This mechanism, formed by a radial crank with a slider/shaft joint unit engaging with an off-center flywheel's radial slots, links the cyclic motion of the vanes. The cranks are positioned opposite the vanes for balance.

In one embodiment, the cylindrical casing is an integrated engine block comprising the power section, drive box, and compressor. The power section and drive box are further configured to function as a compressor, pump, and meter for gases or liquids, providing additional utility.

Another embodiment includes remotely located auxiliary equipment such as an air tank, fuel pump, pressure regulators, valves, and controllers, enabling flexible space management. The kick start air inlet ports are equipped with one-way valves to prevent backflow during operation. The recess on the inner casing wall extends from the exhaust outlet to allow gradual release of combustion gases.

In a further embodiment, the slider/shaft joint unit includes a bearing assembly to reduce friction and wear. The vanes are formed from lightweight, high-strength materials such as titanium alloys to minimize inertial losses. The cylindrical shape of the power casing is optimized to minimize surface area-to-volume ratio, improving thermal efficiency. A control system regulates timing and duration of fuel injection, and ignition, based on engine speed and load.

The three-cycle radial vane piston internal combustion engine of the present invention provides a simplified, compact design that enhances efficiency and performance compared to existing rotary engine configurations. These and other features and advantages of the invention will be apparent from the following detailed description and associated drawings.

Additional features and advantages of the invention will be set forth in the description which follows. These and other features of the present invention will become more fully apparent from the following description, or may be learned by the practice of the invention as set forth hereinafter.

BRIEF DESCRIPTION OF THE DRAWINGS

FIG. 1 is a perspective view of the three-cycle radial vane piston device, showing the integrated engine block housing the power casing, drive box, and compressor, according to one embodiment.

FIG. 2 is a perspective view of the opened power casing, revealing (a) the radial vanes and (b) the drive mechanism within the device, according to one embodiment.

FIG. 3 shows perspective views of (a) the radial vanes and drive mechanism with the casing hidden, and (b) a single vane with the slider flywheel, according to one embodiment.

FIG. 4 depicts (a) a perspective view of a single vane, and (b) an equivalent schematic drawing of the inverted slider-crank mechanism, according to one embodiment.

FIG. 5 illustrates three successive operational views of the radial vane pistons within the power casing, according to one embodiment.

FIG. 6 is a detailed view of the labyrinth-sealing feature of the centrally pivoted vanes, enabling dry operation, according to one embodiment.

DETAILED DESCRIPTION

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

The main components of the present invention, as illustrated by way of example and not limitation in FIG. 1 and FIG. 2, may include:

A power casing 2: In some embodiments, the power casing 2 can be a generally cylindrical casing comprising an air inlet 9, a fuel injector 10, a spark plug port 11, and an exhaust outlet port 12. The power casing 2 is configured to house three meshed radial vane pistons 8 mounted on three substantially coaxial shafts 15, thereby forming three variable volume chambers. The coaxial shafts 15 typically extend through the center of the power casing 2 wall into the adjacent drive box 3.

In another embodiment, the power casing 2 might also include two compressed air kick start ports 14 with control valves 24, disposed proximate to the early stage of the power stroke zone 26, as will be defined later. The two kick start entry ports 14 each can have a one-way valve, and are generally spaced apart so that the vanes substantially never block both ports simultaneously. The one-way valve is configured to prevent pressure loss during normal operation, but it is understood in the art that such valves may change per configuration of the device in different settings.

According to an embodiment, the air inlet port 9 may have a one-way valve and can be equipped with an adjustable pressure regulator valve 23 to supercharge the chamber with fresh air at the desired pressure before further compression takes place.

A drive box 3: In one embodiment, the drive box 3 is a mechanical drive configured to generate a cyclic angular velocity ratio between the vanes, thereby cyclically varying the chamber volumes according to the vane positions, while all rotating in one direction. Each coaxial shaft 15 can have a radial crank 16 that ends with an attachment mechanism 17. The attachment mechanism 17 is a bushing coupled with a slider/shaft joint unit 18. The slider side is configured to slide within radial slots 19 cut in an off-center 20 flywheel 21. The flywheel 21 is mounted off-center 20 with respect to the cylindrical center of the power casing 2, with substantially equally spaced radial slots 19 corresponding to the number of vanes. For each coaxial shaft 15, the crank 16 with the slider/shaft joint unit 18, the radial slot 19, and the off-center 20 flywheel 21 form an inverted slider-crank mechanism, as generally depicted in FIG. 4*b*, that generates cyclic motion and links the motion of each vane with the others through the common flywheel 21.

In another embodiment, the crank 16 can be placed radially on the opposite side of the vane, with the appropriate mass to balance the vane mass.

A compressor 4: In one embodiment, the compressor 4 is a mechanical compressor of any suitable type, driven by the output shaft 5 of the flywheel 21 to supply sufficient compressed air for operation. The compressed air is stored in a remotely located intermediary air tank 6. The compressor 4 has a bypass valve 22 configured to idle the compressor 4 in the event of air oversupply and during kick start, where the compressor 4 load preferably needs to be minimized. The compressor 4 is mounted directly on the output shaft 5 or adjacent to the engine block 1 and is driven by a power transmission means, including but not limited to a V-belt, chain, or gears.

Auxiliary components: In one embodiment, all auxiliary components are remotely located. These components may include an air tank 6, fuel pump, pressure regulators, valves 22 and 23, one-way valves, and various controls needed for optimum operation.

With reference to FIG. 1 and FIG. 2, the present invention discloses a three-cycle (stroke) radial vane piston internal combustion engine. In one embodiment, the engine comprises an engine block 1 that integrates a power casing 2, a drive box 3, and a compressor 4. The compressor 4 is coupled to the output shaft 5 to produce air, which may be stored in an intermediate remote air tank 6. As depicted in FIG. 2A, the power casing cover 7 is removed, revealing the casing 2 and the coaxial meshed radial vanes 8 inside it, forming three variable volume chambers. The power casing 2 includes an air supply port 9 with a one-way valve, a fuel injection port 10, a spark plug 11, and an exhaust port 12 with a gradual discharge slot extension 13. Additionally, the power casing has two kick start air-inlet ports 14, each with a one-way valve and generally spaced apart such that no vane will typically block both ports at any time. FIG. 3A and FIG. 3B illustrate the vanes 8 in detail, with the casings 1 hidden. As shown, the meshed vanes 8 are connected to the coaxial shaft 15, which extends out from the power casing 2 into the drive box 3. Each coaxial shaft 15 has a crank 16 with an attachment mechanism 17 at its end, wherein a slider/shaft joint unit 18 is disposed, as depicted in FIG. 4. The slider side of the slider/shaft joint unit 18 slides within a radial slot 19 in an off-center 20 flywheel 21, thereby forming an inverted slider-crank mechanism. The flywheel 21 comprises three substantially equally spaced radial slots 19, and all vanes 8 are coupled to the same flywheel 21. FIG. 4B shows a schematic drawing of the inverted slider-crank mechanism. Furthermore, as illustrated in FIG. 3, the cranks are placed in the radial opposite direction of the vanes to generally balance them out with the appropriate mass.

The output shaft 5, mounted on the flywheel 21, runs the compressor 4 to supply air. The details of the compressor are not described herein nor claimed.

In another embodiment, since the process optionally requires stored compressed air, the compressed air can be used to kick start the engine by releasing compressed air in the early stage of the power stroke zone 26 through two inlet ports 14, each with a one-way valve, and spaced larger than the vane thickness to typically avoid blockage.

The operation of the engine is illustrated in FIG. 5A-E, which shows the power casing 2 and vanes 8 in successive key positions. The inverted slider-crank mechanism and flywheel 21 in the drive box are depicted in dashed lines.

The key positions are described below by way of example and not limitation:

Position A: As generally shown in FIG. 5A, this position may be substantially equivalent to the top dead center (TDC) position in a conventional internal combustion engine. The flywheel 21 is at a substantially zero angle (the reference position), chamber I is at its minimum volume, and chambers II and III are generally equal in volume. In some embodiments, chamber I can be in the compression stroke, chamber II might be in the power stroke, and chamber III may be in the exhaust stroke, wherein fresh air is optionally fed from the air feed port 9 to flush out exhaust combustion gases through exhaust port 12. The power stroke zone 26 typically starts at the location where vanes shift to be the leading vane for the lagging chamber and ends when exhaust begins. In other words, it spans from vane (a) location proximate to the TDC, as depicted in FIG. 5A, to vane (b) location adjacent to, but not necessarily contacting, the exhaust, as illustrated in FIG. 5A. The lagging chambers within this zone will generally be expanding by the effect of combustion gas pressure, thereby causing the vanes to rotate and harvest work.

Position B: As shown in FIG. 5B, after an angle about several degrees past the TDC, chamber I receives a fuel injection shot and is ready for a spark to start a power stroke. In this configuration, the leading vane (a) has an angular velocity ratio greater than 1 with respect to the lagging vane (c). Hence, upon combustion, the chamber will expand while both vanes rotate in the clockwise (CW) direction for the orientation shown. In other words, vane (a) will rotate CW faster, and vane (c) will follow CW slower. In this position, chamber II is still in the power stroke, overlapping with the power stroke of chamber I. Chamber III is exhausting while fresh air is fed from the air feed port 9 to flush out remaining exhaust combustion gases through exhaust port 12 and fill with it fresh air.

Position C: As generally illustrated in FIG. 5C, chamber I is in the power stroke, chamber II is at its maximum volume, having completed its power stroke and about to exhaust, and chamber Ill is at its final fresh air filling stage.

Position D: In the embodiment shown in FIG. 5D, chamber I is continuing the power stroke, and chamber II is in the exhaust stroke. Chamber III is now performing several tasks, including but not limited to:

(1) It has just trapped a certain amount of fresh air.

(2) Air flow continues from the air inlet port 9 to pressurize chamber III up to the set pressure in the air regulator 23, then the one-way valve will close to prevent flow back upon further compression.

(3) As rotation continues, the trapped air is further compressed by the effect of volume shrinkage to the designed pressure.

Position E: As generally depicted in FIG. 5E, chamber I is continuing the power stroke, chamber II is continuing the exhaust stroke, and chamber III is compressing the fresh air further to the designed pressure.

Then back to position A to complete the cycle. Then cycle is repeated for the next chamber. This covers 120-degree angle of rotation for the output shaft 5, while the power chamber (I) sweeps about 157 degrees and overlap with the preceding power chamber (II) for a total of 253 degrees of work harvesting, for the design shown. This to indicate the potential of efficiency achieved with this design.

Kick start operation: In some embodiments, to start the engine without a starter motor, two compressed air kick start ports 14 are located in the power casing 2 proximate to an early stage of the power stroke zone 26. These ports are used to briefly drive the engine using compressed air until internal combustion takes over. To kick start the engine, the bypass valve 22 is simultaneously opened to minimize the compressor load, and the kick start control valve 24 is opened to supply compressed air to crack the engine.

Four vane engine: Although the engine described above features three vanes, embodiments with four or more vanes will also function in a substantially similar way. However, using more vanes may result in a lower piston expansion ratio, potentially reducing efficiency. Additionally, more coaxial shafts may be less strong and less reliable.

Based on the detailed description provided herein, a skilled artisan would be able to re-create the claimed invention without undue experimentation. The examples above describe the key aspects of the invention in sufficient detail to allow a person having ordinary skill in the field of rotary engines to make and use the invention. It is also contemplated that a typical embodiment of the instant invention will employ the techniques and terminology described herein.

The illustrations of embodiments described herein intended to provide a general understanding of the structure of various embodiments, and not intended to serve as a complete description of all the elements and features of apparatus and systems that might make use of the structures described herein. Many other embodiments will be apparent to those of skill in the art upon reviewing the above description.

Other embodiments may be utilized and derived from the present invention, such that structural and logical substitutions and changes may be made without departing from the scope of this disclosure.

Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A three-cycle radial vane piston internal combustion engine, comprising:

a. an engine block integrating a power casing, a drive box, and a compressor;

b. the power casing comprising:

i. a cylindrical shape with a spark plug, a fuel injector, an air inlet, an exhaust outlet, and two kick start air inlet ports;

ii. three or more meshed radial vane pistons mounted on three centrally located coaxial shafts, forming three variable volume chambers;

iii. the coaxial shafts extending through the power casing wall into the drive box;

c. the drive box comprising:

1. for each coaxial shaft of the three centrally located coaxial shafts, a respective radial crank is opposite to the respective radial vane piston of the three or more meshed radial vane pistons for balancing purposes, each radial crank having a bushing at its end with a slider/shaft joint unit;
2. an off-center flywheel with equally spaced radial slots corresponding to the number of the radial vane pistons, the slider/shaft joint unit of each of the radial vane pistons sliding within the radial slots;
3. wherein for each coaxial shaft, the radial crank with the slider/shaft joint unit, the radial slot, and the off-center flywheel form an inverted slider-crank mechanism that links the cyclic motion of each of the radial vane pistons with the others through the radial slots;

d. the power casing further comprising the two kick start air inlet ports with one-way valves, placed at an early stage of a power stroke zone, spaced apart to avoid radial vane piston blockage of both of the two kick start air inlet ports; and e. a recess on the inner power casing wall extended from the exhaust outlet for gradual release of combustion gases.

2. The three-cycle radial vane piston internal combustion engine of claim 1, wherein the radial vane pistons are centrally pivoted, allowing for optional no-contact labyrinth sealing for dry operation without oil.

3. The three-cycle radial vane piston internal combustion engine of claim 1, further comprising a remote air tank, a fuel pump, pressure regulators, remote valves, and controllers as auxiliary equipment that can be remotely located for space management.

4. The three-cycle radial vane piston internal combustion engine of claim 1, wherein the two kick start air inlet ports are equipped with the one-way valves to prevent backflow of air during operation and the two kick start air inlet ports are placed at early stage of the power stroke zone, spaced apart to avoid the radial vane piston blockage of both of the kick start air inlet ports in order to crank the engine without a starter motor.

5. The three-cycle radial vane piston internal combustion engine of claim 1, wherein the recess on the inner power casing wall extends from the exhaust outlet to facilitate a gradual and extended release of combustion gases.

6. The three-cycle radial vane piston internal combustion engine of claim 1, wherein the radial vane pistons are formed from a lightweight, high-strength material to minimize inertial losses during operation.

7. The three-cycle radial vane piston internal combustion engine of claim 6, wherein the lightweight, high-strength material is a titanium alloy.

8. The three-cycle radial vane piston internal combustion engine of claim 1, wherein the cylindrical shape of the power casing is optimized to minimize the surface area-to-volume ratio, thereby reducing heat loss and improving thermal efficiency.

9. The three-cycle radial vane piston internal combustion engine of claim 1, further comprising a control system for regulating the timing and duration of the fuel injection, and ignition, based on engine speed and load conditions.

* * * * *